United States Patent
Li et al.

(10) Patent No.: US 9,197,133 B2
(45) Date of Patent: Nov. 24, 2015

(54) VOLTAGE WAVEFORM DETECTOR, POWER CONTROLLER AND CONTROL METHOD FOR SWITCHED-MODE POWER SUPPLIES WITH PRIMARY-SIDE CONTROL

(71) Applicant: Shamrock Micro Devices Corp., Taipei (TW)

(72) Inventors: Jian-He Li, Hsinchu (TW); Chun-Ming Lin, Hsinchu (TW)

(73) Assignee: SHAMROCK MICRO DEVICES CORP., Taipei (TW)

( * ) Notice: Subject to any disclaimer, the term of this patent is extended or adjusted under 35 U.S.C. 154(b) by 560 days.

(21) Appl. No.: 13/633,497

(22) Filed: Oct. 2, 2012

(65) Prior Publication Data

US 2014/0016358 A1  Jan. 16, 2014

(30) Foreign Application Priority Data

Jul. 11, 2012 (TW) .............................. 101124859 A

(51) Int. Cl.
    H02M 3/335 (2006.01)
    H02J 1/00 (2006.01)
    H02M 1/00 (2007.01)

(52) U.S. Cl.
    CPC .. *H02M 3/33523* (2013.01); *H02M 2001/0003* (2013.01)

(58) Field of Classification Search
    CPC ................ H02M 3/33507; H02M 2001/0009; H02M 2001/0025; H02M 3/156; H02M 3/33523
    USPC ............... 363/15, 21.02, 21.04, 21.08–21.09, 363/21.12–21.17
    See application file for complete search history.

(56) References Cited

U.S. PATENT DOCUMENTS

| | | | |
|---|---|---|---|
| 7,054,170 B2* | 5/2006 | Yang et al. | 363/21.18 |
| 2006/0018135 A1* | 1/2006 | Yang et al. | 363/21.14 |
| 2006/0050539 A1* | 3/2006 | Yang et al. | 363/21.16 |
| 2006/0055433 A1* | 3/2006 | Yang et al. | 327/10 |
| 2012/0113684 A1* | 5/2012 | Wang et al. | 363/21.01 |
| 2012/0224397 A1* | 9/2012 | Yeh | 363/21.12 |
| 2013/0294118 A1* | 11/2013 | So et al. | 363/21.16 |
| 2014/0016366 A1* | 1/2014 | Su et al. | 363/21.12 |

* cited by examiner

*Primary Examiner* — Adolf Berhane
*Assistant Examiner* — Henry Lee, III
(74) *Attorney, Agent, or Firm* — McClure, Qualey & Rodack, LLP

(57) ABSTRACT

Disclosed are a voltage waveform detector, a power controller and a control method used therein, adaptive for a switched-mode power supply having a power switch and an inductive device. A disclosed power controller has a voltage waveform detector and a constant-current control unit. The voltage waveform detector estimates a discharge time of the inductive device when the power switch is turned off. In the voltage waveform detector, a differential capacitor is coupled between an input node of a comparator and a feedback node, at which the feedback voltage corresponds to a reflection voltage of the inductive device. The constant-current control unit integrates a current-detection signal over the discharge time to control a maximum output current of the switched-mode power supply.

14 Claims, 4 Drawing Sheets

VOLTAGE WAVEFORM DETECTOR, POWER CONTROLLER AND CONTROL METHOD FOR SWITCHED-MODE POWER SUPPLIES WITH PRIMARY-SIDE CONTROL

CROSS-REFERENCE TO RELATED APPLICATION

This application claims priority to and the benefit of Taiwan Application Series Number 101124859 filed on Jul. 11, 2012, which is incorporated by reference in its entirety.

BACKGROUND

The present disclosure relates generally to switched-mode power supplies with primary side control.

Power supplies are necessary for most of electronic products, to convert the energy from grid power lines or batteries into a power source with specifications required for an electronic product. Switched-mode power supply (SMPS), which commonly employs a power switch and an inductive device for power conversion, is superior in view of conversion efficiency and compact product size, and is popularly adopted in the art. A transformer with a primary side winding and a secondary side winding works as an inductive device for isolation-type SMPS.

There are two types of control technologies regarding to isolation-type SMPS: primary side control (PSC) and secondary side control (SSC). SSC directly detects an output terminal powered by the secondary winding and sends the detect result via a photo coupler to a power controller in the primary side, which accordingly controls the current passing through the primary winding, so as to increase or decrease the power stored in the transformer. Opposite to SSC, PSC detects, for example, a reflection voltage on an auxiliary winding in the primary side to accordingly control the current passing through the primary winding, where the reflection voltage is about in proportion to the output voltage in the secondary side. Simply put, SSC performs voltage detection in the secondary side while PSC does in the primary side. PSC might be more effective in cost, because it does not need the large, costly photo coupler that SSC needs. PSC might be more efficient in respect to power conversion, because it lacks the secondary-side detection circuit which constantly consumes power all the time.

FIG. 1 is a SMPS 10 in the art, employing PSC. A bridge rectifier 20 rectifies alternative current grid power lines AC into direct current input power line $V_{IN}$, which might be of about a constant voltage or have an M-shaped voltage waveform following the voltage variation of the grid power lines AC. A power controller 26 drives, via the GATE node, to periodically turn ON and OFF the power switch 34. When the power switch 34 is turned ON, performing a short circuit, the current passing through the primary winding PRM increases and so does the electric power stored in the transformer. When it is turned OFF, performing an open circuit, the electric power stored in the transformer releases to build up the output power $V_{OUT}$ (for output load 24) and the operation power $V_{CC}$ (for the power controller 26), via the secondary winding SEC and the auxiliary winding AUX, respectively.

Resistors 28 and 30, forming a voltage divider, together detect the voltage drop $V_{AUX}$ across the auxiliary winding AUX to provide feedback voltage $V_{FB}$ at the feedback node FB of the power controller 26. At the time when the power switch 34 is just turned OFF, the voltage drop $V_{AUX}$ is the reflection voltage to the voltage drop across the secondary winding SEC. Based upon the feedback voltage $V_{FB}$, the power controller 26 builds up a compensation voltage $V_{COM}$ over a compensation capacitor 32 and accordingly controls the duty cycle of the power switch 34. The current-sense voltage $V_{CS}$ at node CS informs the power controller 26 the amplitude of the current $I_{PRM}$ through the primary winding PRM and the power switch 34.

FIG. 2 demonstrates the gate signal $V_{GATE}$, the feedback voltage $V_{FB}$, and the secondary output current $I_{SEC}$. If the peak value of the secondary output current $I_{SEC}$ and the real discharge time $T_{DIS-R}$ when the secondary winding SEC discharges the stored energy are acquired, both the total electric charge amount and the average current outputted from the secondary winding can be derived, such that the power controller 26 could regulate the maximum average output current from the secondary winding SEC.

Conventional discharge time detection is to detect the timing when the feedback voltage $V_{FB}$ drops across 0V the first time after the power switch is turned OFF (i.e. the gate signal $V_{GATE}$ is 0 in logic). The detection result works as an indicator of the end of an estimated discharge time $T_{DIS-E}$, which expectedly starts at the time when the gate signal $V_{GATE}$ turns to 0 in logic, as shown in FIG. 2. The estimated discharge time $T_{DIS-E}$ differs with the real discharge time $T_{DIS-R}$, however, because the secondary winding, in fact, completes discharging before the feedback voltage $V_{FB}$ drops to 0V. This difference, as shown in FIG. 2, could render uncertainty and misjudgment to the output current from the secondary winding SEC. A SMPS employing the convention discharge time detection, as a result, hardly makes the maximum average output current regulation accurately meet a specified target.

In this specification, the apparatuses or devices with the same symbol are the same or similar in respect to functionality, structure, or feature, and their alternatives could be derived by persons skilled in the art based on the disclosed teaching herein. The explanation of these alternatives is omitted for brevity.

SUMMARY

Embodiments of the present invention disclose a voltage waveform detector. The voltage waveform detector comprises a detection node, a comparator, and at least one differential capacitor. The detection node provides a voltage detection signal. The comparator has two input nodes and an output node. The differential capacitor is coupled between the detection node and one of the two input nodes. When the voltage detection signal starts dropping, the comparator switches an output logic value from the output node to indicate the occurrence of the dropping.

Embodiments of the present invention also disclose a power controller adaptive for a switched-mode power supply with primary-side control. The switched-mode power supply has a power switch and an inductive device. The power controller has voltage waveform detector, and a constant-current control unit. The voltage waveform detector estimates a discharge time of the inductive device when the power switch is turned off. The voltage waveform detector comprises a comparator with two input nodes and a differential capacitor, coupled between one of the input nodes and a feedback node. A feedback voltage at the feedback node corresponds to a reflection voltage of the inductive device. The constant-current control unit integrates a current-detection signal over the discharge time. The current-detection signal corresponds to a current passing through the inductive device.

Embodiments of the present invention also disclose a control method for use in a switched-mode power supply with primary-side control. The switched-mode power supply has a power switch and an inductive device. A passive differentiator is coupled between an input node of a comparator and a feedback node. A feedback voltage at the feedback node corresponds to a reflection voltage of the inductive device. According to an output of the comparator, an end of a discharge time of the inductive device is determined when the power switch is turned off. A maximum output current of the switched-mode power supply is controlled according to the discharge time.

BRIEF DESCRIPTION OF THE DRAWINGS

The invention can be more fully understood by the subsequent detailed description and examples with references made to the accompanying drawings, wherein.

DETAILED DESCRIPTION

Figure 1:
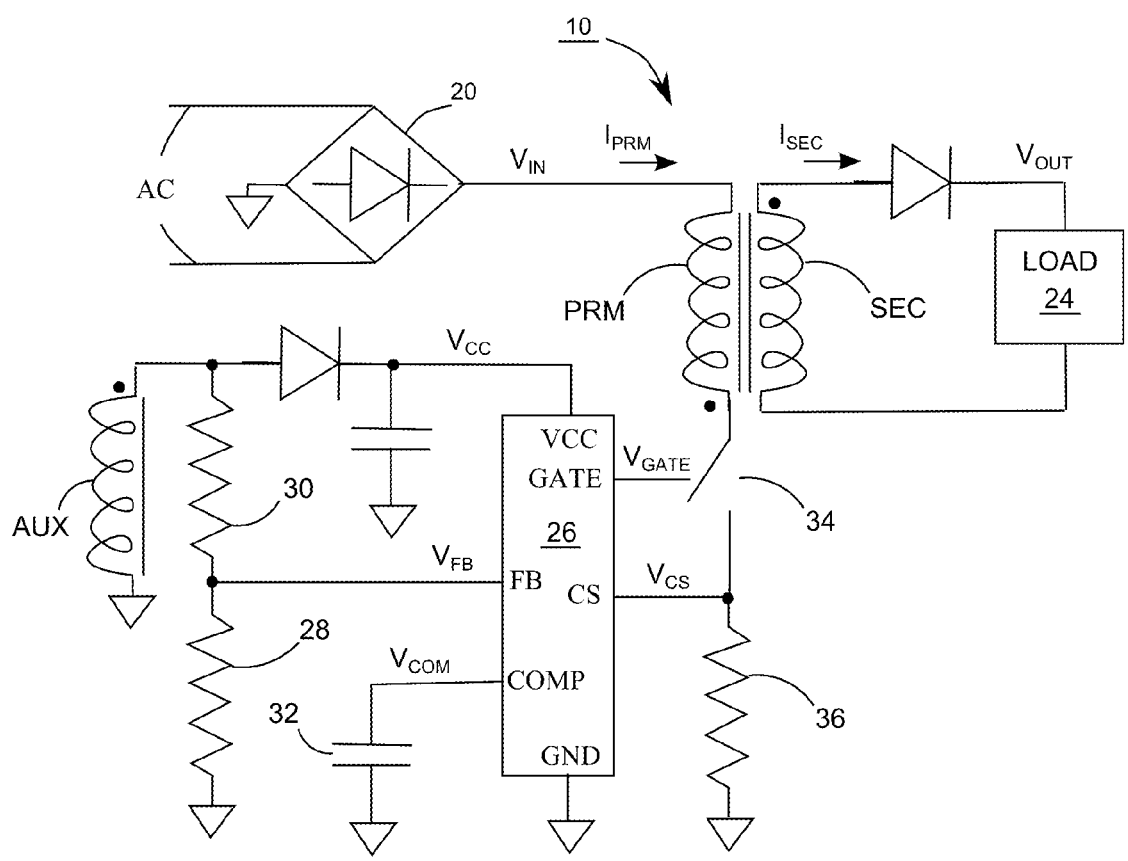
FIG. 1 shows a SMPS in the art.
Figure 3:
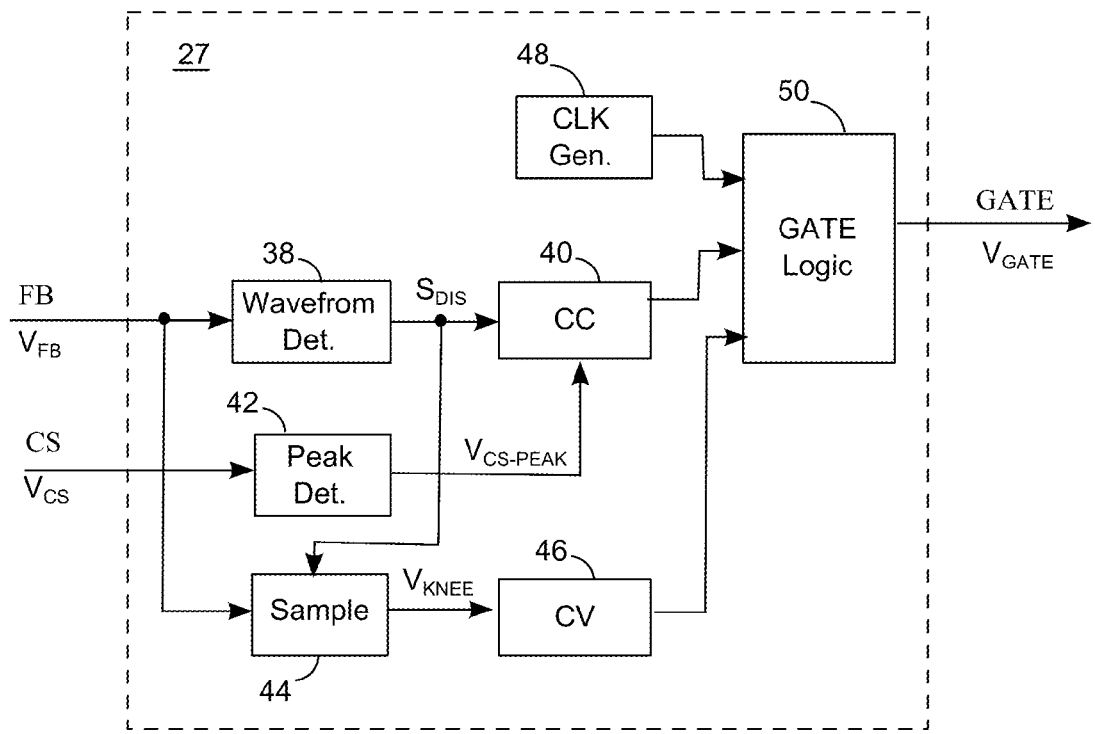
FIG. 3 exemplifies a power controller according to an embodiment of the invention.

FIG. 3 exemplifies a power controller 27 according to an embodiment of the invention. Hereinafter, the power controller 27 replaces the power controller 26 in FIG. 1 to be an embodiment of the invention. This invention is not limited to the SMPS 10 of FIG. 1, however.

Inside the power controller 27 are a voltage waveform detector 38, a constant-current control unit 40, a peak detector 42, a sampler 44, a constant-voltage control unit 46, a clock generator 48, and gate logic 50. Based on the results from the clock generator 48, the constant-current control unit 40, and the constant-voltage control unit 46, the gate logic 50 generates the gate signal $V_{GATE}$ to turn on or off the power switch 34 via the node GATE.

The clock generator 48 periodically triggers the gate logic 50 to turn on the power switch 34. The voltage waveform detector 38 provides discharge signal $S_{DIS}$ according to the waveform of the feedback voltage $V_{FB}$ at the node FB. The discharge signal $S_{DIS}$ can point out whether the feedback voltage $V_{FB}$ starts to abruptly drop, so as to estimate a discharge time $T_{DIS-NE}$ for the transformer in FIG. 1. The peak detector 42 generates peak signal $V_{CS-PEAK}$ which represents the peak value of the current-sense voltage $V_{CS}$ at the current-sense node CS. The constant-current control unit 40 integrates the peak signal $V_{CS-PEAK}$ over the discharge time $T_{DIS-NE}$, and accordingly provides control signals to the gate logic 50. The constant-current control unit 40 can make average output current $I_{SCE-AVG}$ (the average of the secondary output current $I_{SEC}$) no more than a predetermined value, and has been exemplified by, for example, several embodiments in US patent application US20100321956. The sampler 44 samples the feedback voltage $V_{FB}$ based on the timing provided from the discharge signal $S_{DIS}$ to generate knee voltage $V_{KNEE}$. The constant-voltage control unit 46 controls the gate logic 50 and utilizes the whole feedback system to regulate the knee voltage $V_{KNEE}$, making it to be around 2.5V for example.

Figure 4:
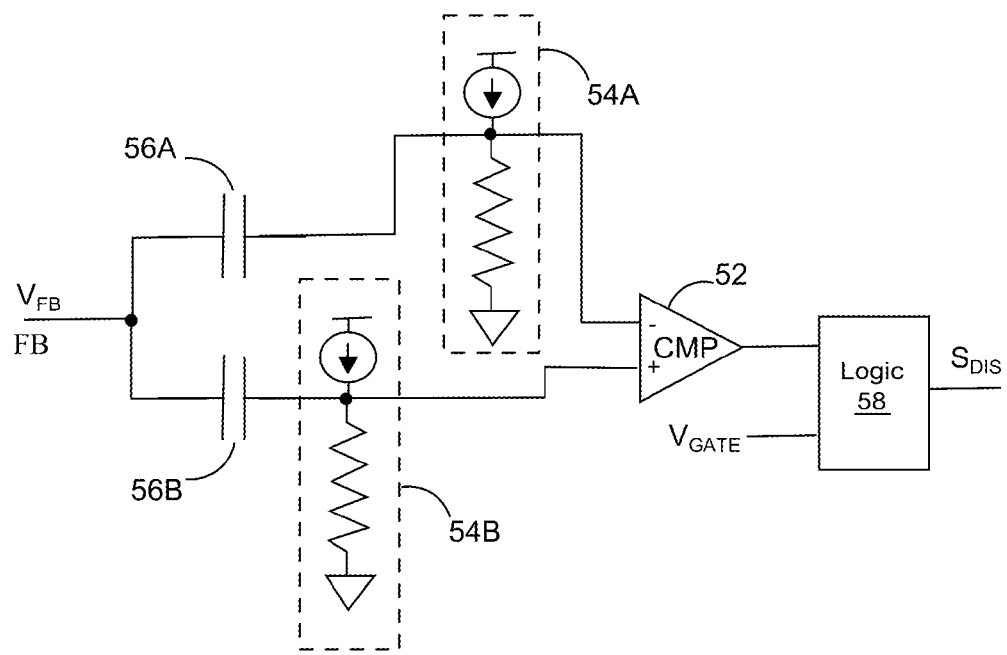
FIG. 4 demonstrates a voltage waveform detector according to an embodiment of the invention.

FIG. 4 demonstrates the voltage waveform detector 38, having logic 58, differential capacitors 56A and 56B, bias circuits 54A and 54B, and a comparator 52. Bias circuits 54A and 54B, each having a constant current source and a resistor connected in series, substantially define the direct-current (DC) bias voltages at the two inputs of the comparator 52. As shown in FIG. 4, the differential capacitor 56A is coupled between the feedback node FB and the inverted input of the comparator 52, while the capacitor 56B is coupled between the feedback node FB and the non-inverted input. Practically, the DC bias voltages at the two inputs of the comparator 52 are substantially the same, but the capacitances of the differential capacitors 56A and 56B differ with each other considerably. The differential capacitors 56A and 56B in company with the resistors in the bias circuits 54A and 54B also form a pair of passive differentiators, each locating at one input of the comparator 52. This kind of design could make the output of the comparator 52 stay in a logic value when the feedback voltage $V_{FB}$ is substantially stable. When the feedback voltage $V_{FB}$ starts dropping abruptly as the transformer completes discharging, the coupling effect provided from the differential capacitors 56A and 56B causes the two input voltages of the comparator 52 to drop simultaneously. The voltage drop rates at the two inputs differ to each other, however, because of the capacitance difference between the differential capacitors 56A and 56B. Once the voltage difference between the two inputs of the comparator 52 is large enough, the comparator 52 switches its output logic value to indicate the occurrence of dropping of the feedback voltage $V_{FB}$. The logic 58 provides the discharge signal $S_{DIS}$ according to the gate signal $V_{GATE}$ and the output of comparator 52.

Figure 5:
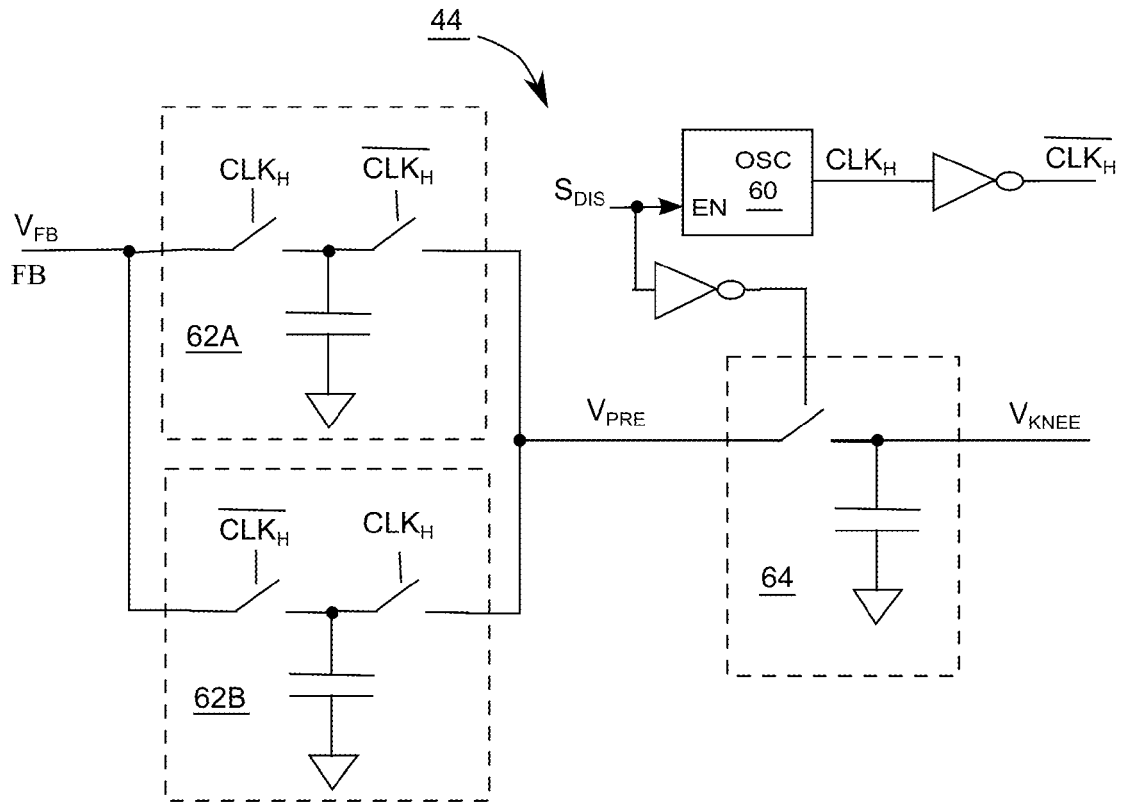
FIG. 5 demonstrates a sampler in FIG. 3.

FIG. 5 demonstrates the sampler 44, which has a sampling clock generator 60, two sample circuits 62A and 62B, and an output buffer 64. The discharge signal $S_{DIS}$ with a logic value of 1, implying that the transformer is discharging, enables the sampling clock generator 60 to periodically toggle sampling clock $CLK_H$, which causes sample circuits 62A and 62B alternatively to sample the feedback voltage $V_{FB}$ and generate sampled signal $V_{PRE}$. When the discharge signal $S_{DIS}$ changes to 0 in logic, the sampling clock $CLK_H$ stays constantly in either 1 or 0 in logic, and the output buffer 64 passes the sampled signal $V_{PRE}$ to be the knee voltage $V_{KNEE}$.

Figure 6:
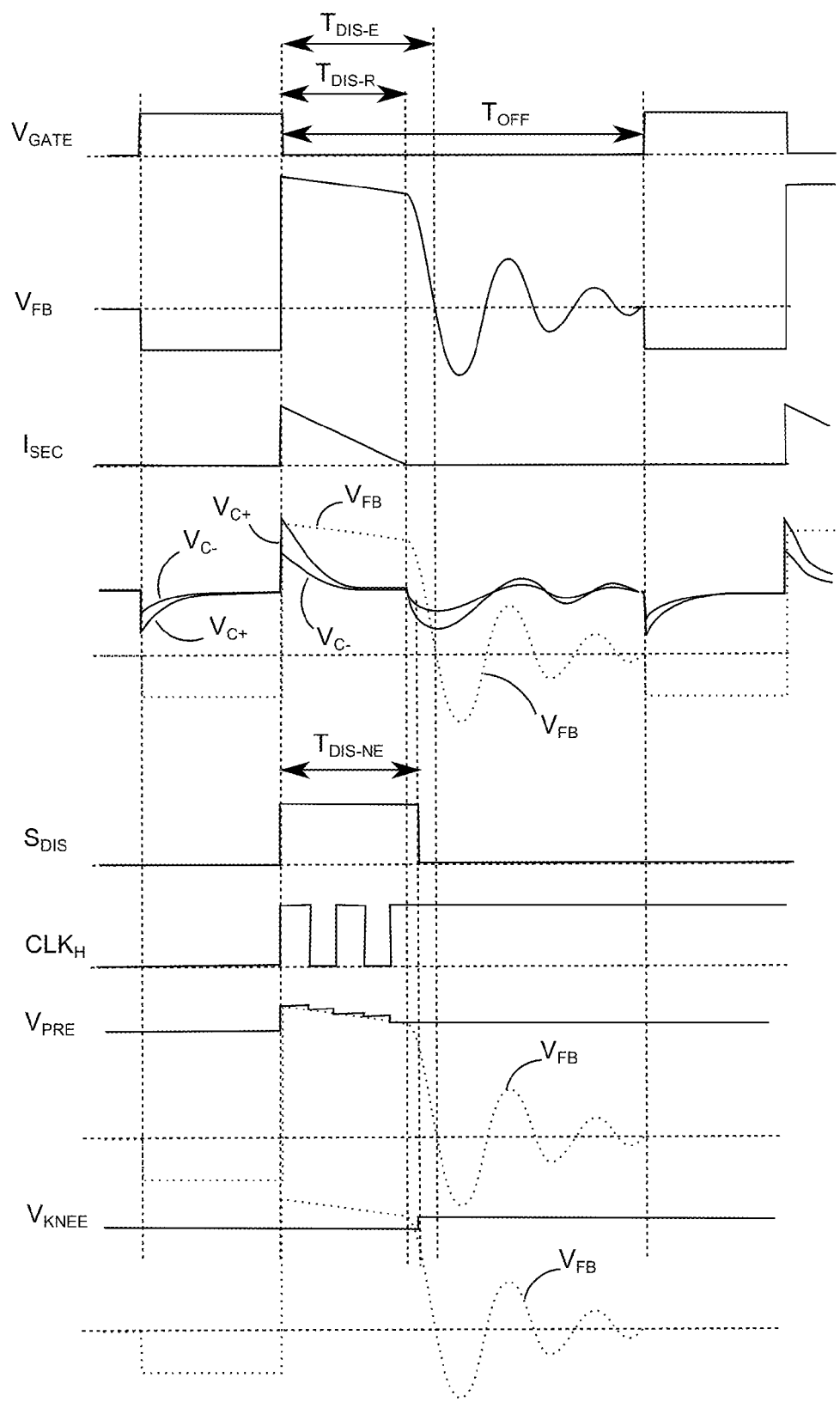
FIG. 6 demonstrates some signals in FIGS. 3, 4 and 5.

FIG. 6 demonstrates some signals in FIGS. 3, 4 and 5, to example the operation of one embodiment of the invention. Beside of the gate signal $V_{GATE}$, the feedback voltage $V_{FB}$, and the secondary output current $I_{SEC}$, which are the same with those in FIG. 2, FIG. 6 further shows non-inverted voltage $V_{C+}$ and inverted voltage $V_{C-}$ (respectively at the non-inverted and the inverted input nodes of the comparator 52), the discharge signal $S_{DIS}$, the sampling clock $CLK_H$, the sampled signal $V_{PRE}$, and the knee voltage $V_{KNEE}$. For illustration and comparison, the feedback voltage $V_{FB}$ is repeated twice in dash lines to company with the sampled signal $V_{PRE}$, and the knee voltage $V_{KNEE}$. When the gate signal $V_{GATE}$ turns off the power switch 34, OFF time $T_{OFF}$ starts. The discharge signal $S_{DIS}$ switches to 1 in logic to indicate the beginning of the OFF time $T_{OFF}$. The non-inverted voltage $V_{C+}$ and inverted voltage $V_{C-}$ are two differentiation results of the feedback voltage $V_{FB}$ (due to the existence of the two differential capacitors 56A and 56B). As shown in FIG. 6, when these two differentiation results differs a lot, the discharge signal $S_{DIS}$ toggles to 0 in logic to claim the ending of the discharge time $T_{DIS-NE}$.

During the discharge time $T_{DIS-NE}$ the sampling clock generator 60 is enabled to periodically toggle its output logic value. Following the toggling, the sample circuits 62A and 62B alternatively sample the feedback voltage $V_{FB}$ to generate the sampled signal $V_{PRE}$. Accordingly, the sampled signal $V_{PRE}$ stepwise decreases, when the feedback voltage $V_{FB}$ continuously decreases. During the discharge time $T_{DIS-NE}$, the output buffer 64 isolates the sampled signal $V_{PRE}$ from the knee voltage $V_{KNEE}$, which accordingly retains its analog value as it was in the previous switching cycle. After the discharge time $T_{DIS-NE}$ ends, sampling clock generator 60 stops the toggling at its output, the sampled signal $V_{PRE}$ updates the knee voltage $V_{KNEE}$.

Figure 2:
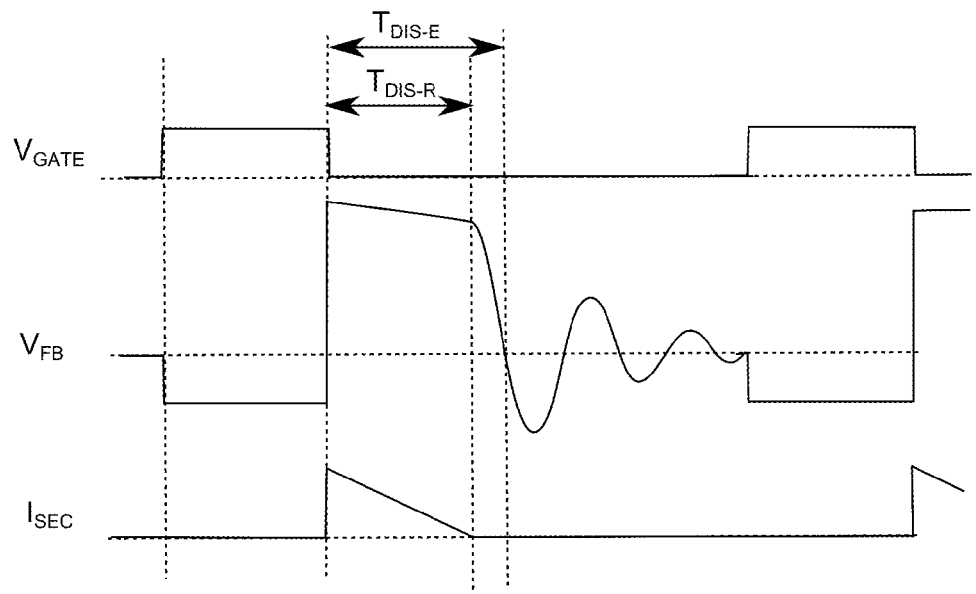
FIG. 2 demonstrates the gate signal $V_{GATE}$, the feedback voltage $V_{FB}$, and the secondary output current $I_{SEC}$ of FIG. 1.

FIG. 6 also reshows the discharge time $T_{DIS-E}$ in FIG. 2 of the prior art. Different from the method used in FIG. 2 that generates the discharge time $T_{DIS-E}$, the method used in FIG. 6 according to one embodiment of the invention need not detect the timing when the feedback voltage drops across 0V to claim the end of the discharge time $T_{DIS-EN}$. As a result, in comparison with the discharge time $T_{DIS-E}$ in the art, the discharge time $T_{DIS-EN}$ ends earlier and approaches closer to the real discharge time $T_{DIS-R}$. The better the discharge time $T_{DIS-EN}$, the more accurate the maximum output current control from the secondary side.

Accordingly to one embodiment of the invention, the knee voltage $V_{KNEW}$ must be a sampled result of feedback voltage $V_{FB}$ at a time very close to but before when discharge time $T_{DIS-EN}$ ends, and at that time the secondary output current $I_{SEE}$ is about 0 A. Accordingly, the knee voltage $V_{KNEW}$ objectively represents the voltage of the output power $V_{OUT}$ because the secondary output current $I_{SEC}$ almost distributes no voltage drop. A good output voltage regulation can be expected.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A voltage waveform detector, comprising:
    a detection node, for providing a voltage detection signal;
    a comparator with two input nodes and an output node;
    at least one differential capacitor coupled between the detection node and one of the two input nodes; and
    two bias circuits, each having a current source and a resistor connected in series, for defining a direct-current bias voltage at a corresponding input node of the two input nodes;
    wherein when the voltage detection signal starts dropping, the comparator switches an output logic value from the output node to indicate the occurrence of the dropping.

2. The voltage waveform detector as claimed in claim 1, comprising two differential capacitors respectively coupled to the two input nodes.

3. A power controller, adaptive for a switched-mode power supply with primary-side control, wherein the switched-mode power supply has a power switch and an inductive device, the power controller comprising:
    a voltage waveform detector, for estimating a discharge time of the inductive device when the power switch is turned off, the voltage waveform detector comprising:
        a comparator with two input nodes; and
        a differential capacitor, coupled between one of the input nodes and a feedback node, wherein a feedback voltage at the feedback node corresponds to a reflection voltage of the inductive device; and
    a constant-current control unit, for integrating a current-detection signal over the discharge time;
    wherein the current-detection signal corresponds to a current passing through the inductive device; and
    wherein the voltage waveform detector has two bias circuits, each having a current source and a resistor connected in series, for defining a direct-current bias voltage at a corresponding input node of the comparator.

4. The power controller as claimed in claim 3, wherein the voltage waveform detector comprises two differential capacitors respectively coupled to the two input nodes.

5. A power controller, adaptive for a switched-mode power supply with primary-side control, wherein the switched-mode power supply has a power switch and an inductive device, the power controller comprising:
    a voltage waveform detector, for estimating a discharge time of the inductive device when the power switch is turned off, the voltage waveform detector comprising:
        a comparator with two input nodes; and
        a differential capacitor, coupled between one of the input nodes and a feedback node, wherein a feedback voltage at the feedback node corresponds to a reflection voltage of the inductive device;
    a constant-current control unit, for integrating a current-detection signal over the discharge time, wherein the current-detection signal corresponds to a current passing through the inductive device; and
    two sample circuits, for alternatively sampling the feedback voltage during the discharge time;
    wherein the sample circuits alternatively generate a sampled signal, the power controller further comprises an output buffer for isolating the sampled signal from an output result during the discharge time and for passing the sampled signal to update the output result after the discharge time.

6. The power controller as claimed in claim 5, further comprising:
    a sampling clock generator, for providing a sampling clock which toggles during the discharge time and controls the sample circuits.

7. A control method for use in a switched-mode power supply with primary-side control, wherein the switched-mode power supply has a power switch and an inductive device, the control method comprising:
    coupling a passive differentiator between an input node of a comparator and a feedback node, wherein a feedback voltage at the feedback node corresponds to a reflection voltage of the inductive device;
    determining an end of a discharge time of the inductive device when the power switch is turned off according to an output of the comparator; and
    controlling a maximum output current of the switched-mode power supply according to the discharge time.

8. The control method as claimed in claim 7, comprising:
    coupling two passive differentiators to two input nodes of the comparator.

9. The control method as claimed in claim 8, each passive differentiator has a capacitor, and the capacitor in one of the two passive differentiators has capacitance different from the capacitor of the other passive differentiator.

10. The control method as claimed in claim 7, comprising:
    alternatively sampling the feedback voltage during the discharge time.

11. The control method as claimed in claim 10, comprising:
    alternatively sampling the feedback voltage during the discharge time to provide a sampled signal; and
    using the sampled signal to update the output result after the discharge time.

12. The control method as claimed in claim 11, comprising:
    blocking the sampled signal from the output result during the discharge time.

13. The control method as claimed in claim 10, further comprising:
   integrating a current-detection signal over the discharge time, wherein the current-detection signal corresponds to a current passing through the inductive device.

14. The control method as claimed in claim 10, comprising:
   providing a peak signal representing the peak value of a current-sense voltage, the current-sense voltage corresponding to the current passing through the inductive device; and
   integrating the peak signal over the discharge time.

* * * * *